United States Patent [19]

Eriksson

[11] Patent Number: 5,213,453
[45] Date of Patent: May 25, 1993

[54] COOLING SYSTEMS IN TAPPING ATTACHMENTS SUITABLE FOR HIGH PRESSURE APPLICATIONS

[75] Inventor: Alf Eriksson, Nacka, Sweden

[73] Assignee: Tapmatic Corporation, Irvine, Calif.

[21] Appl. No.: 724,384

[22] Filed: Jun. 28, 1991

[51] Int. Cl.⁵ .................... B23B 51/06; B23G 1/46
[52] U.S. Cl. ................................... 408/57; 279/20
[58] Field of Search ............... 408/56, 57, 59; 279/20; 409/135, 135

[56] References Cited

U.S. PATENT DOCUMENTS 3,264,906  8/1966  Swords .................... 408/59
3,487,748  1/1970  Grage ..................... 409/136
4,396,317  8/1983  Staron et al. ............. 10/141 H

FOREIGN PATENT DOCUMENTS 2435188  2/1976  Fed. Rep. of Germany ........ 279/20

Primary Examiner—Daniel W. Howell
Attorney, Agent, or Firm—Joseph R. Evanns

[57] ABSTRACT

In a self-reversing tapping attachment an improved coolant system includes at least one fluid flow orifice at the end of a fluid flow conduit contained in a drive spindle member and further includes a fluid contact member for generating force to prevent interference with the drive spindle member prior to tapping a hole. Provision is further made for self-correction of any tendency for back pressure of fluid flow to interfere with motion of the drive spindle member by provision for covering the fluid flow orifice during motion under back pressure, thereby reducing such pressure. A collector chamber and exit orifice for expulsion to ambient of coolant fluid prevent invasion of the inner mechanism by coolant under back pressure.

12 Claims, 2 Drawing Sheets

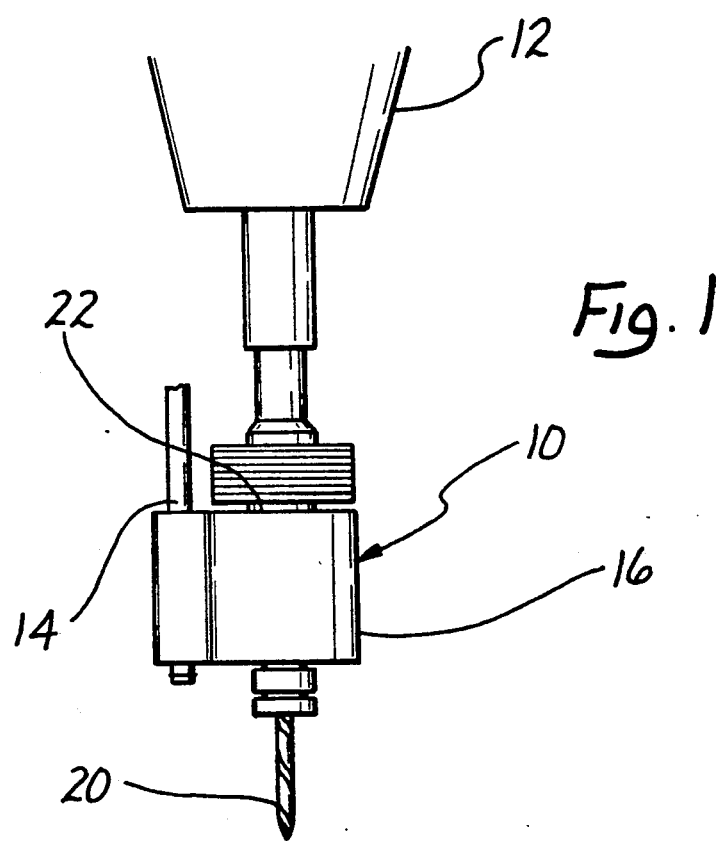

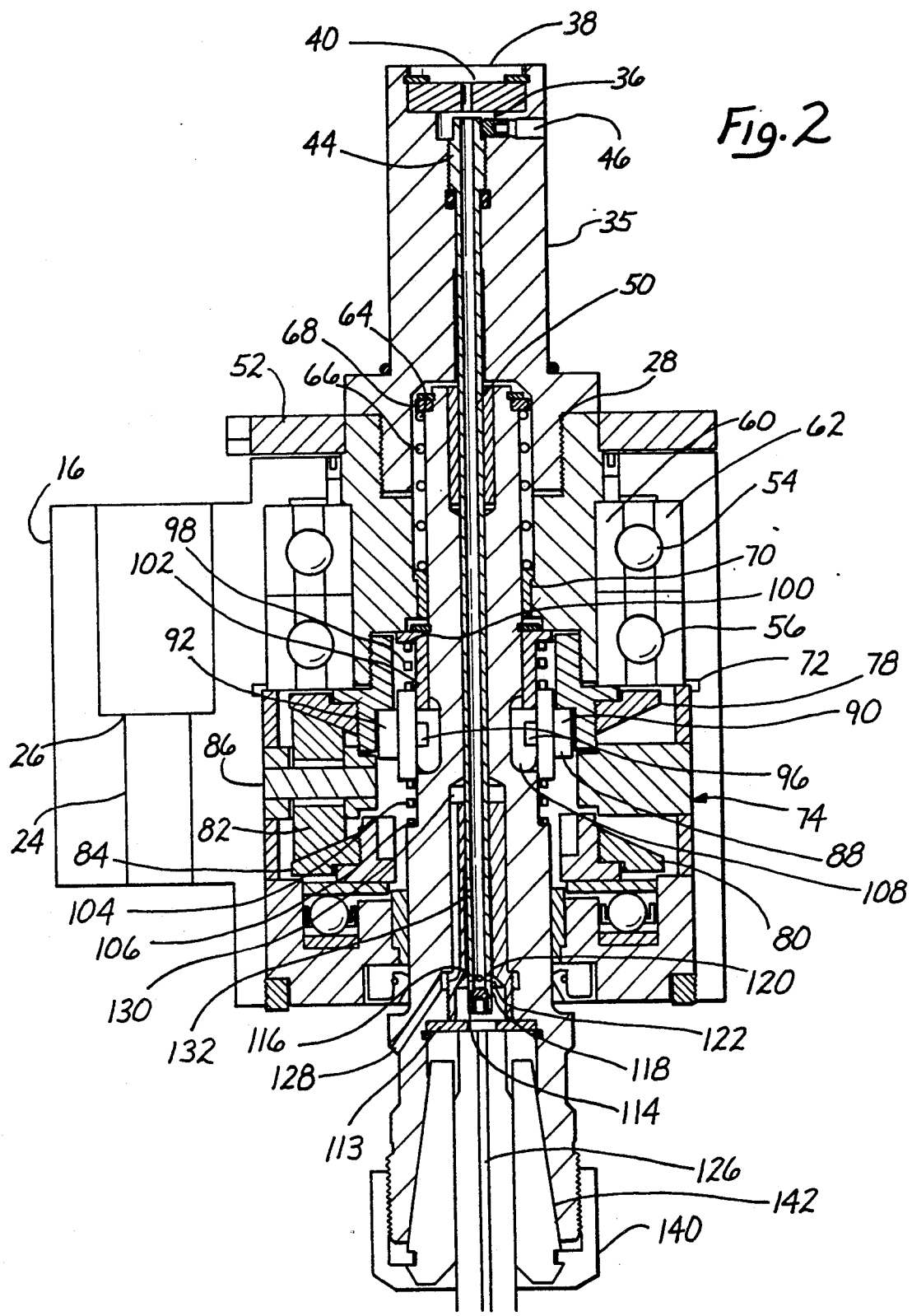

COOLING SYSTEMS IN TAPPING ATTACHMENTS SUITABLE FOR HIGH PRESSURE APPLICATIONS

BACKGROUND OF THE INVENTION

1. Field of the Invention

The invention relates and pertains to tapping attachments, particularly those of the self-reversing variety, and to coolant systems for use in connection with such tapping attachments, tapping attachment being tools connectable to a source of rotational power for the purpose of imparting rotational drive to a tap held in such tapping attachment, whereby a threaded hole is made.

2. Description of the Prior Art

The field of the invention is represented by prior art patents including U.S. Pat. Nos. 3,397,588; 3,472,347; 3,717,892; 3,946,844; 3,999,642; 4,014,421; 4,029,429, 4,067,424 and 5,011,344. All are assigned to the assignee of this application.

Tapping attachments, and in particular self-reversing tapping attachments, comprise a crowded and highly developed art. Tapping attachments are tools connectable to a source of rotational drive and for holding a tap used to make threaded holes. Self-reversing tapping attachments are those which contain means for reversing the direction of rotation of the tap so as to facilitate withdrawal thereof from a threaded hole.

Increased demands recently placed upon tapping attachments have resulted in new constraints and requirements upon tapping equipment. In particular, the advent of Computer Numeric Control (CNC) of tapping operations has fostered a requirement of rapid and precise operation of tapping attachments and of the taps carried by them. Accompanying the development of high speed, high performance tapping, under CNC or manual control, is a need for providing coolant to tapping attachments and in particular to the tap and the workpiece in which the taps make a threaded holes. Such coolant provides not only cooling but also clears debris such as cuttings and the like from the workpiece. Co-pending patent application Ser. No. 07/330,752 filed Mar. 30, 1989, now abandoned, assigned to the assignee of the instant application, discloses and claims a coolant conduit arrangement which is suitable for regular tapping applications. Other existing devices also make provision for furnishing a coolant to a tap and the workpiece.

Existing devices such as the tapping attachment described in co-pending application Ser. No. 07/330,752 filed Mar. 30, 1989 to the same assignee and related Continuation-in-Part application Ser. No. 07/715,343, filed Jun. 14, 1991 provide coolant conduits to achieve the purposes referred to above. Under extremely high speed and/or high-pressure conditions, however, and under conditions where the tap may have a smaller coolant opening and cross-section than the coolant conduit in the tapping attachment, problems can arise due to back pressure of the coolant flow.

When there is back pressure in tapping attachments which are self-reversing such as those described in the above-specified co-pending applications and in other existing devices, such back pressure not only can result in a loss of coolant to the tap and an escape of fluid into parts of the system where it should not be, but also such back pressure can directly adversely affect the operation of the spindle and tap themselves. This is due to the fact that in self-reversing tapping attachments, the tap is subjected to reverse rotation for the purpose of facilitating its withdrawal from the threaded hole. Under this arrangement, existing devices provide for relative axial movement of the spindle driver along the direction of the drive spindle for the purpose of shifting into reverse drive. Thus, back pressure can cause unwanted motion or forces tending to cause such motion relative to the spindle and its driver, to the detriment of the tapping operation itself.

Therefore, there has been a felt but unfulfilled need for a self-reversing tapping attachment having a coolant system whereby problems associated with back pressure of coolant can be resolved.

SUMMARY OF THE INVENTION

In a self-reversing tapping attachment providing for flow of coolant to the tap and workpiece and having a drive spindle member axially movable with respect to the tapping attachment an improved coolant system comprises a coolant conduit member within said drive spindle member defining at least one fluid flow orifice for flow of coolant, at least one fluid contact member for contacting coolant fluid flowing from the flow orifice to produce a force upon the spindle member preventing displacement thereof from a proper position prior to tapping a hole. At least one member is engagable to cover the fluid flow orifice to prevent back pressure of the coolant fluid from interfering with motion of the spindle member. Expulsion to ambient of coolant fluid under back pressure is provided.

BRIEF DESCRIPTION OF THE DRAWINGS

FIG. 1 is a side view, somewhat simplified, of a tapping attachment containing a coolant system in accordance with the invention, the tapping attachment being shown as connected to a power source; and FIG. 2 is a sectional view of the tapping attachment of FIG. 1 depicting a coolant system in accordance with the invention.

DETAILED DESCRIPTION OF A PREFERRED FORM OF THE INVENTION AND PREFERRED METHOD OF PRACTICE

Co-pending application Ser. No. 07/330,752 filed Mar. 30, 1989 assigned to the assignee of the instant application, and related continuation-in-part application filed Jun. 14, 1991, Ser. No. 07/715,343, also assigned to the assignee of the instant application, are hereby incorporated by reference herein. Many of the parts and components, as well as the overall system of a self-reversing tapping attachment are described and depicted in the co-pending applications and are common subject matter with the instant application. In the description which follows, only brief reference will be made to parts described and depicted in the co-pending applications, and for purposes of brevity and clarity, overlap between the instant application and the co-pending applications will be avoided to the extent possible.

As depicted in FIG. 1, a tapping attachment 10 containing a coolant system in accordance with the invention is connected to a power source 12. Tapping attachment 10 includes a stationary stem member 14 (shown fragmentarily only) which connects to the driving machine 12 for the purpose of restraining motion of the housing 16 of tapping attachment 10. Contained in the tapping attachment 10 is a drive spindle member 18 holding a tap 20.

Whereas housing 16 of tapping attachment 10 is held stationary, a moveable part 22 of the tapping attachment 10 is connected to power source 12, thus providing power for rotation of the spindle member 18 and tap 20.

Referring also now to FIG. 2, stem 14 includes a lower part 24 having a smaller diameter and creating an annular shoulder 26 which, in conjunction with a coil spring (not shown), provides for some axial movement of the stem 14. Moveable part 22 includes an upwardly extending portion 34 which is received in driving machine 12. Within part 34 is a central bore 36. Disposed within bore 36 is an insert member 38. Part 38 comprises a seal and inlet nozzle for the coolant, and defines a coolant flow passage 40.

Disposed axially below part 38 is coolant tube member 44. Coolant tube member 44 is disposed within bore 36 of part 34. An upper portion of coolant tube member 44 is threaded for fastening into position in bore 36. An adjusting screw 46 adjusts the position of tube 44 to afford correct alignment of tube 44 with passage 40 in part 38. A static seal member 48 is disposed within bore 38 for purposes of sealing coolant, i.e. to prevent leakage around the outside of tube 44.

Disposed within part 36 is bushing 50. Bushing 50 is preferably of bronze composition and is machined for close tolerances. Coolant tube 44 is positioned to pass through bushing 50 with very close clearance. This is to inhibit any possible coolant flow up the outside of tube 44 which could result in escape of fluid into the tapping attachment.

Moveable part 22 forms an upper flange 52. As described in more detail in the co-pending applications, positioned between housing 16 of attachment 10 and the moveable part of 22 are ball bearings 54, 56, provided for stabilization. Bearing 54 includes a ball 58 and components 60, 62 for defining ball races for the ball 58. Bearing 56 and its components are identical to bearing 54 and its components 58, 60 and 62.

Moveable part 22 defines a bore 64 in which is disposed a coil spring 66, the upper end of which engages with a seal 68. The lower end of coil spring 66 engages a shoulder 70 at the lower end of bore 64.

Disposed within housing 16 is forward drive member 72. The tapping attachment 10 is shown as being in the forward drive mode. As described more fully and in detail in the co-pending applications, a bevel gear mechanism 74 is utilized for purposes of reversing. Briefly, bevel gear mechanism 74 includes a cage 76 containing three bevel pinion gears 78, 80, and 82. A ring gear 84 is positioned to be engageable with the three bevel pinion gears 78, 80, 82. Each bevel pinion gear 78, 80, 82 has a shaft or arbor 86, one of which may be seen in numeral 86, all of these being alike, the gear shaft being journalled in the cage 76.

In the depicted configuration, forward drive member 72 is engaged in forward driving relationship with a drive transmitting means 88 in the form of a dog ring 88. As described in the co-pending applications, dog ring 88 is of generally annular configuration and is equipped with at least two outer dogging elements 90, 92 and a pair of inner drive elements 94, 96. Dog ring 88 is engaged with the lower end of a spring 98 whose upper end bears upwardly against a flange 100 of a drive sleeve 102.

A spring 104 disposed beneath dog ring 88 in the depicted configuration bears upwardly on the lower periphery of dog ring 88 and downwardly upon a shoulder 106 of drive spindle member 18. Drive pins 108, 110 on spindle member 18 are depicted as engaged in forward driving mode with drive elements 94, 96, respectively.

Disposed around coolant tube 44 at its inner axial end is bushing 112. Bushing 112 is made of bronze and has close clearance with the tube 44 as does bushing 50 and for the same purpose of preventing seepage of coolant.

Tube 44 is blocked at its axially inner end 113 by plug 114. As a result, coolant is forced to exit the coolant tube 44 through a plurality of flow orifices 116, 118, 120 defined in the tube 44 adjacent the blocked end 113 thereof. In the preferred embodiment, there are four (4) flow orifices, three (3) of which are shown.

As the coolant exits orifices 116, 118, 120 it encounters an angle member 122 positioned opposite orifices 116, 118, 120. The flow of coolant against angle member 122 produces a force in a direction tending to push axially on drive spindle member 18 thus tending to keep spindle member 18 in the correct position prior to initiating the tapping of a hole. Thus, not only does the flow of coolant not tend to displace the drive spindle member 18 as in existing devices but it also contributes to stabilization of the position and the motion of the drive spindle member 18.

From flow orifices 116, 118, 120 and angle member 122, after contacting angle member 122, coolant flows to a chamber 124 disposed beneath the end of tube 44 and from there flows to conduit 126 of tap 20.

In the event that back pressure may tend to urge spindle member 18 away from the correct position, fluid flow is reduced as a consequence of close tolerance covering over of the flow orfices 116, 118, 120 when drive spindle member 18 moves retractively, (i.e. axially upwardly).

An exit orifice 128 is defined in drive spindle member 18 and connected to the exterior of the tube 44 providing an exit passage to ambient for any coolant which may seep up the outside of tube 44 past bushing 112. Such fluid flow through the escape passage 128 stems from moisture which may flow past the snug fit between tube member 44 and bushing 112. This fluid is collected in a collector chamber 130 disposed above and adjacent to bushing 112. Fluid from chamber 130 flows through an intermediate passage 132 through exit 128 and to ambient.

As described in detail in the co-pending applications a quick change mechanism 140 is disposed around the drive spindle member 18 at the part thereof which carries the tap 20. A tap holder mechanism described in detail in the co-pending applications designated by references numeral 142 holds tap 20 in place within drive spindle 18.

Thus, in the manner described hereinabove a self-reversing tapping attachment is provided including a coolant flow system which not only efficiently provides coolant to the tap and to the workpiece but which prevents any untoward or undesired motion of the spindle and further causes stablization of the spindle and its positioning due to the fluid flow. In addition, any excess of fluid flow causes a cutting-off of that flow as a result of motion produced thereby on the drive spindle member 18, providing a self-correcting feature.

The foregoing is descriptive and illustrative, the scope of the invention being defined by the appended claims interpreted in light of the specification.

What is claimed is:

1. In a self-reversing tapping attachment providing for flow of coolant to the tap and workpiece and having a drive spindle member axially movable with respect to the tapping attachment an improved cooling system comprising:
    (a) a coolant conduit member within said drive spindle member, said coolant conduit member defining at least one flow orifice for flow of coolant therethrough;
    (b) at least one fluid contact member for contacting coolant fluid flowing from said at least one flow orifice, said fluid contact member comprising a surface and being positioned at an angle to the flow of said coolant fluid to produce upon contact with said flow of said coolant fluid an axial force upon said drive spindle member to prevent displacement of said drive spindle member from a proper position prior to tapping a hole.

2. The invention as set forth in claim 1 further including at least one member engagable to cover said at least one flow orifice to prevent back pressure of said coolant fluid from interfering with motion of said drive spindle member.

3. The invention as set forth in claim 2 wherein said covering member comprises at least one bushing member engagable with said drive spindle member whereby upon motion due to back pressure by said drive spindle member, fluid flow will be reduced by covering said at least one flow orifice, thereby reducing said back pressure and tending to correct motion of said drive spindle member.

4. The invention as set forth in claim 1 further including a coolant flow passage between said fluid contact member and said conduit member in said tap, and further including an exit orifice for flow to ambient of coolant under back pressure.

5. The invention as set forth in claim 4 further including at least one collector chamber for collecting coolant prior to passage to ambient thereof.

6. In a self-reversing tapping attachment including a drive spindle member for carrying a tap for threading holes the improvement comprising:
    (a) a coolant conduit disposed within said drive spindle member, said coolant conduit defining at least one coolant flow orifice for passage of coolant fluid therethrough;
    (b) means for covering said at least one coolant flow orifice upon movement of said drive spindle member under back pressure to correct movement of said drive spindle member by inhibiting the flow of coolant fluid through said at least one coolant flow orifice.

7. The invention as set forth in claim 6 further including flow contact means in the flow path of coolant from said at least one coolant flow orifice for contacting said coolant flow to produce force upon said drive spindle member for preventing interference with the motion of the drive spindle member under back pressure from fluid flow prior to initiating tapping of a hole.

8. The invention as set forth in claim 6 further including means defined in said spindle member providing an exit passage to prevent coolant fluid from entering the inner workings of the tapping attachment.

9. The invention as set forth in claim 9 further including a coolant collector chamber in said drive spindle member for collecting coolant prior to expulsion thereof through said exit orifice to ambient.

10. The invention as set forth in claim 6 further including a bushing member engagable with said drive spindle member to prevent coolant flow between said bushing member and said drive spindle member.

11. The invention as set forth in claim 9 wherein said means for covering at least one coolant flow orifice in said driving spindle member comprises a second bushing member engagable with said drive spindle member to prevent flow of coolant therebetween.

12. The invention as set forth in claim 7 wherein said flow contact means comprises a surface inclined at an angle to coolant flow from said at least one coolant flow orifice.

* * * * *